United States Patent [19]

Wurster et al.

[11] 4,404,104
[45] Sep. 13, 1983

[54] CATIONIC ADSORPTION AGENT

[75] Inventors: Rudolf F. Wurster, Pfeffingen; Jürg Merz, Therwil, both of Switzerland

[73] Assignee: Ciba-Geigy Corporation, Ardsley, N.Y.

[21] Appl. No.: 301,154

[22] Filed: Sep. 11, 1981

Related U.S. Application Data

[62] Division of Ser. No. 162,275, Jun. 23, 1980, Pat. No. 4,316,005.

[30] Foreign Application Priority Data

Jun. 28, 1979 [CH] Switzerland .......................... 6036/79
Feb. 4, 1980 [CH] Switzerland ............................ 869/80

[51] Int. Cl.$^3$ ............................................. B01D 15/04
[52] U.S. Cl. .................................... 210/684; 210/679; 210/683
[58] Field of Search ..................... 210/679, 683, 684; 521/39

[56] References Cited

U.S. PATENT DOCUMENTS

| | | | |
|---|---|---|---|
| 2,367,455 | 1/1945 | Bock et al. | 521/39 |
| 3,189,646 | 6/1965 | Rainer | 8/182 |
| 4,178,438 | 12/1979 | Haase et al. | 536/30 |

*Primary Examiner*—Theodore E. Pertilla
*Attorney, Agent, or Firm*—Edward McC. Roberts

[57] ABSTRACT

A cationic adsorption agent which is obtained by reaction of
  (a) an amino compound which contains at least one amino group and at least one free or methylolated carboxamide group, with
  (b) an aminoplast precondensate which does not contain amino groups.

The novel adsorption agent is suitable in particular for removing anionic substances, such as acid dyes or reactive dyes, from aqueous solutions, especially from wastewaters.

15 Claims, No Drawings

CATIONIC ADSORPTION AGENT

This is a divisional of application Ser. No. 162,275 filed on June 23, 1980, now U.S. Pat. No. 4,316,005, issued Feb. 16, 1982.

The present invention relates to a cationic adsorption agent which is suitable for removing anionic substances from aqueous solutions, especially from wastewaters, e.g. from filtrates, residual liquors of bleaching or dyeing processes, rinsing and wash waters.

The adsorption agent of this invention is obtained by reaction of (a) an amino compound which contains at least one amino group and at least one free or methylolated carboxamide group, with (b) an aminoplast precondensate which does not contain amino groups.

Component (b) is a compound which contains amide groups but no basic amino groups. Components (a) and (b) together advantageously contain at least two N-methylolamide groups.

It is particularly advantageous if the adsorption agent is obtained with amino compounds (a) of the formula

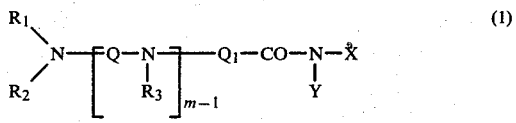

wherein m is 1 to 5, each of $R_1$, $R_2$ and $R_3$ independently is hydrogen, lower alkyl which is unsubstituted or substituted by halogen, hydroxyl, lower alkoxy or cyano, or is cycloalkyl, benzyl or the group of the formula

or $R_1$ and $R_2$, together with the nitrogen atom to which they are attached, denote a 5- or 6-membered heterocyclic radical, preferably pyrrolidino, piperidino, morpholino or piperazino, or, if m is 2, $R_2$ and $R_3$, together with the grouping $>N-Q-N<$ which links them, denote a divalent 5- or 6-membered heterocyclic radical, especially an imidazolidino or piperazino ring, or, if m is greater than 2, each $R_3$, or individual substituents $R_3$, together with the adjacent $R_5$ and the grouping $>N-Q-N<$ which links them, also denote a divalent 5- or 6-membered heterocyclic radical, especially a piperazino ring; each of Q and $Q_1$ independently is alkylene of 1 to 8 carbon atoms, X is hydrogen or $-CH_2OH$, and Y is hydrogen, lower alkyl or $-CH_2OH$.

Preferred amino compounds of the formula (1) are those in which m is 1 or 2, namely the monoamino or diamino compounds.

Especially preferred mono- and diamino compounds suitable for use as component (a) are those of the formula

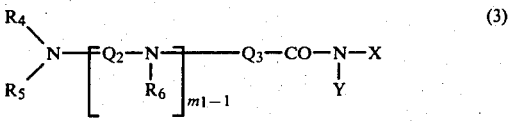

wherein $m_1$ is 1 or 2, each of $R_4$, $R_5$ and $R_6$ independently is hydrogen, lower alkyl, benzyl or the group of the formula

or $R_4$ and $R_5$, together with the nitrogen atom to which they are attached, denote a 5- or 6-membered heterocyclic radical, especially pyrrolidino, piperidino or morpholino, or, if m is 2, $R_5$ and $R_6$, together with the grouping $>N-Q-N<$ which links them, denote a piperazino ring, and each of $Q_2$ and $Q_3$ is $C_1$–$C_3$ alkylene, and X and Y have the given meanings. Amino compounds of the formula (3) in which $m_1$ is 1, and which contain only a single grouping of the formula (4), are still more preferred. In these compounds, $Q_3$ is preferably the ethylene or propylene group, $R_4$ and $R_5$ are preferably lower alkyl, Y is especially hydrogen, and X is preferably $-CH_2OH$.

In the definition of the radicals of the novel compounds, lower alkyl or alkoxy are usually those groups or group constituents which contain 1 to 5, especially 1 to 3, carbon atoms, e.g. methyl, ethyl, n-propyl, isopropyl, n-butyl, sec-butyl or amyl, or methoxy, ethoxy or isopropoxy.

Halogen in connection with all substituents denotes e.g. fluorine, bromine or, preferably, chlorine.

Suitable for use as component (b) are adducts of formaldehyde with methylolatable amide compounds which do not contain basic amino groups, e.g. ureas, thioureas and amino-1,3,5-triazines.

Suitable urea and thiourea compounds are e.g. urea, thiourea, substituted areas such as alkyl or aryl ureas, alkylene ureas and alkylene diureas such as ethylene urea, propylene urea, dihydroxyethylene urea, hydroxypropylene urea and acetylene diurea, and also dicyandiamide, dicyandiamidine, urones and hexahydropyrimidones.

Examples of 1,3,5-aminotriazines which may be mentioned are: melamine and N-substituted melamines, such as N-butyl-melamine, N-trihalogenomethyl melamines, triazones, ammeline, guanamines, e.g. benzoguanamine, acetoguanamines, diguanamines, and guanidines.

Suitable aminoplast precondensates are both primarily mono-molecular compounds and higher condensed products.

Both completely methylolated and only partially methylolated compounds, which can also be etherified, also yield useful products.

Preferred methylol compounds are those of the ureas and amino-1,3,5-triazines specified above. Of these compounds, N-methylol ureas and N-methylol melamines are especially preferred. It is also possible to use partial ethers of such methylol compounds, e.g. with alkanols containing 1 to 4 carbon atoms, such as methanol, ethanol, n-propanol or n-butanol.

Specific aminoplast precondensates (b) are e.g.: N,N'-dimethylol urea, methylol urea, N,N'-dimethylol urea dimethyl ether, N,N'-tetramethylol acetylene diurea, N,N'-dimethylol ethylene urea, N,N'-dimethylol propylene urea, 4,5-dihydroxy-N,N'-dimethylol ethylene urea, N,N'-dimethylol-5-hydroxypropylene urea, 4-methoxy-5,5-dimethyl-N,N'-dimethylolpropylene urea, N,N'-dimethylol-5-oxapropylene urea, 4,5-dihydroxy-N,N'-dimethylolethylene urea dimethyl ether, dimethylol melamine, trimethylol melamine, tetramethylol melamine, hexamethylol melamine, hexamethylol melamine pentamethyl ether, pentamethylol melamine dimethyl or trimethyl ether, hexamethylol melamine hexamethyl or hexaethyl ether. Of these compounds, N,N'-dimethylol urea and tri- to hexamethylol melamines are especially preferred. It is also possible to use mixtures of these methylolated urea and melamine compounds.

The cationic adsorption agent of the present invention is obtained by reacting (a) an amino compound which contains at least one amino group and at least one free or methylolated carboxamide group, with (b) an aminoplast precondensate which does not contain amino groups or with its production mixture.

The reaction is preferably conducted in a neutral or acid medium, e.g. at a pH value from 2 to 7 and advantageously at a temperature in the range from 20° to 200° C., preferably from 50° to 180° C. and most preferably from 60° to 120° C.

It is preferred to employ a catalyst. Suitable catalysts are organic or inorganic peroxides or persalts, e.g. barium peroxide, dicumyl peroxide, di-tert-butyl peroxide, diacetyl peroxide, dibenzoyl peroxide, benzoyl peroxide, benzoyl acetyl peroxide, dilauryl peroxide, hydrogen peroxide, percarbonates such as potassium percarbonate, persulfates such as ammonium persulfate, or perborates.

Preferred catalysts, however, are inorganic and/or organic acids or anhydrides or salts thereof, e.g. sulfurous acid, sulfuric acid, sulfamic acid, phosphoric acid, hydrochloric acid, chloroacetic acid, maleic acid or the anhydride thereof, ammonium chloride, ammonium nitrate, ammonium phosphate, ammonium acetate or aluminium sulfate. Sulfamic acid is especially preferred.

The adsorption agent of the present invention is advantageously synthesised from 1 mole of component (a) and 0.2 to 10 moles, preferably 0.2 to 3.5 moles and, most preferably, 0.5 to 2 moles, of component (b).

The reaction products accordingly contain as a rule 1% by weight, preferably 2 to 6% by weight, of basic nitrogen. The total nitrogen content, which also comprises the amide nitrogen, is usually at least 10% by weight, preferably 15% to 30% by weight.

The adsorption agent of the present invention is suitable in particular for removing anionic substances from aqueous solutions, especially from wastewaters, and its efficiency is substantially greater than that of conventional adsorbents. Compared with known agents, e.g. activated carbon, the novel adsorption agent is distinguished in particular by a pronounced adsorptive capacity for substances, especially anionic substances, which are dissolved or dispersed in water.

Accordingly, the present invention also provides a process for removing anionic substances from aqueous solutions, which process comprises bringing said aqueous solutions into contact with the novel cationic adsorption agent.

This process is suitable in particular for purifying aqueous liquors which contain organic anionic substances and mixtures thereof. It is possible in particular to remove anionic dyes, fluorescent whitening agents, dyeing or textile assistants, surfactants, tannins and mixtures thereof from the wastewaters to a satisfactory degree. In the practice of this invention, wastewaters which contain mixtures of anionic dyes and anionic assistants can be successfully purified.

On account of the broad applicability of the adsorption agent used in this invention, it is possible to meet the nowadays ever more urgent demand for saving fresh water by a partial to complete recirculation of residual or waste liquors. Independently of the apparatus used, these are principally the wastewaters of the dyestuff, fibre manufacturing, textile, paper, and leather industry, which occur in connection with dyeing, bleaching, washing and tanning processes. In the case of a dyeworks, these wastewaters can originate from the conventional dyeing machines used for the dyeing of loose fibrous material, tops, yarn, and woven and knitted fabrics, and also from cleaning machines, e.g. an open-width washer.

The purification of the wastewaters is advantageously carried out in the temperature range from 2° to 150° C. with the preferred range, however, being from 10° to 100° C., especially 20° to 70° C. If desired, it is also possible to purify the wastewaters under pressure or in vacuo. The pH of the liquor can vary within wide limits, for example from 2 to 12. Depending on the nature of the adsorption agent employed, pH adjustments, for example to a value of 2 to 9, in particular of 3 to 8, can simplify and speed up the purification process.

The treatment of the wastewaters can be carried out discontinuously, semi-continuously or continuously. In principle, the following three processes are suitable within the scope of the invention:

(a) the stirring process, in which the water to be purified is stirred in a vessel with the adsorption agent and then the two are separated;

(b) the fluidised bed process, in which the adsorption agent is kept in suspension through the stream of the liquor to be purified;

(c) the fixed bed process, in which the liquor to be purified is conducted through a filter-like adsorption agent.

If the last of these three process variants, process (c), is applied, then the following three alternatives with respect to the apparatus employed are especially suitable:

1. The treatment apparatus, e.g. dyeing appliance, is firmly connected to the filter device.

2. The adsorber device is movable and can be coupled as required with any treatment apparatus.

3. The wastewaters originating from the treatment apparatus are combined in a suitable container and then jointly passed through the adsorption material.

If desired, the cationic adsorption agent to be employed in the practice of this invention can be mixed with other ion exchangers or adsorbents, e.g. activated carbon and/or other known filtration aids, e.g. peat, kieselguhr or diatomaceous earth. For example, the activated carbon may be added to the novel adsorption agent in an amount of 2 to 95% by weight, preferably 10 to 70% by weight, based on the weight of the cationic adsorption agent.

Possible dyes which can be removed from wastewaters in the practice of this invention are anionic dyes which are both soluble and dispersible in water, and fluorescent whitening agents. In particular, the process of the invention is suitable for removing water-soluble anionic dyes or fluorescent whitening agents.

The anionic dyes are dyes whose anionic character is dependent on metal complex formation alone and/or on the acid substituents which impart the water-solubility. Suitable acid substituents which impart the water-solubility are carboxylic acid groups, phosphoric acid groups, acylated sulfonic acid imide groups, such as alkyl- or aryldisulfimide groups or alkyl- or arylcarbonylsulfimide groups, alkyl- or arylimide groups, sulfuric acid esters groups and especially sulfonic acid groups.

The anionic dyes can belong to a variety of different types of dye. As examples there may be mentioned oxazine, triphenylmethane, xanthene, nitro, acridone, stilbene, perinone, naphthoquinone-imine, phthalocyanine, anthraquinone and azo dyes. These last mentioned dyes can be metal-free, metallisable or metal-containing monoazo, disazo and polyazo dyes, including formazane dyes, in which the metal atom forms a 1:1 or 1:2 complex, especially 1:2 chromium or 1:2 cobalt complexes which contain two similar or two different molecules of azo dye complexed to a chromium or a cobalt atom. These dyes can also contain in the molecule reactive groups, i.e. groups which form a covalent bond with the fibrous material to be dyed.

The novel adsorption agent is suitable not only for decolourising residual liquors of the dyestuffs industry and those emanating from the dyeing of textiles, paper and leather, but is also most useful when it is a matter of eliminating residues of anionic fluorescent whitening agents from wash and bleach liquors.

The fluorescent whitening agents can belong to any class of whitener compounds. The anionic fluorescent whitening agents are in particular stilbene compounds, pyrazolines, dibenzoxazolyl or dibenzimidazolyl compounds or naphthalimides which contain in the molecule at least one acid group, for example a carboxylic acid group or preferably a sulfonic acid group, and which can be fibre reactive.

A further advantage of the adsorption agent of this invention is that, besides removing the dyes, it permits also at least a partial elimination of non-ionic and anionic surfactants and textile and dyeing assistants, as well as phosphates, from aqueous waste liquors. Such assistants are described in more detail in "Tenside-Textilhilfsmittel-Waschrohstoffe" by Dr. Kurt Lindner (published by Wissenschaftliche Verlagsgesellschaft Stuttgart, 1964).

The cationic adsorption agent can also be effective in the elimination of anionic synthetic tannins, especially tannins that carry one or more sulfo groups in the molecule. A more detailed description of these compounds can be found e.g. in "Ullmans Encyclopädie der technischen Chemie", Vol. 11, pp. 595–598. The cationic adsorption agent can also be used as general anion exchanger.

Appropriate choice of the adsorption agent makes it possible to extract up to 100% of the impurities from the wastewaters. It is possible to achieve retardant effects of up to 50 g of waste matter, i.e. dye, fluorescent whitening agent, assistant, detergent, tannin, per 100 g of adsorption agent.

It is preferred to decolour wastewaters having a dye concentration of 0.01 to 1 g/l. Whenever a complete docolourisation or removal of the waste substance cannot be accomplished by a single treatment of the waste liquor with the adsorption agent, it is advisable to repeat the purification procedure.

After adsorption of the impurities, the adsorption agent can be easily separated from the purified wastewater. It has a high solids content and can therefore be incinerated direct without drying. If desired, the adsorption agent can also be regenerated with the aid e.g. of a dilute aqueous sodium hydroxide solution.

The invention is illustrated by the following Examples, in which percentages are by weight.

EXAMPLE 1

4.8 g of N,N'-dimethylol urea are added to 8.6 g of a 40% aqueous solution of the compound of the formula $$(C_2H_5)_2N\text{—}CH_2CH_2\text{—}CONH\text{—}CH_2OH \tag{11}$$

whereupon the mixture is adjusted to a pH value of 3 with conc. hydrochloric acid. With efficient stirring, the acid mixture is then heated to 150° C. and kept at this temperature for 15 minutes, during which time water is removed and the reaction mass becomes hard. After further condensation for 15 hours, 8 g of a condensation product with a nitrogen content of 22.4% are obtained.

EXAMPLES 2 TO 9

The procedure described in Example 1 is repeated, using the starting materials listed in columns 2 and 3 of Table 1 in the specified amounts, and at the pH values indicated in column 4. Reaction products with the nitrogen content indicated in column 5 are obtained.

TABLE 1

| Example | g | Aminoplast precondensate | g | Amino compound | pH | N content in % |
|---|---|---|---|---|---|---|
| 2 | 7.2 | N,N'—dimethylol urea | 8.6 | formula (11) | 3 | 18 |
| 3 | 2.4 | N,N'—dimethylol urea | 8.6 | formula (11) | 7 | 22.4 |
| 4 | 4.8 | N,N'—dimethylol urea | 2.8 | 2-N,N—diethylaminopropionate | 3 | 23.1 |
| 5 | 4.8 | N,N'—dimethylol urea | 4 | N,N'—diacetoamidopiperazine | 3 | 27.1 |
| 6 | 4.8 | N,N'—dimethylol urea | 2.3 | N,N'—β-dipropionamidopiperazine | 3 | 21.7 |
| 7 | 4.8 | N,N'—dimethylol urea | 3.8 | N—β-propionamidopiperidine | 3 | 25.8 |
| 8 | 4.8 | N,N'—dimethylol urea | 2.28 | N,N—diethyl-N',N'—β-dipropionamidopropyldiamine | 3 | 21.7 |
| 9 | 4.3 | N,N',N''—trimethylol melamine | 8.6 | formula (11) | 3 | 25.3 |

EXAMPLE 10

3.4 g of 35.7% formaldehyde and 2.4 g of urea are added to 8.6 g of a 40% aqueous solution of the compound of the formula (11). The mixture is then adjusted to pH 3 with conc. hydrochloric acid. With efficient stirring, the acid mixture is then heated to 150° C. and kept at this temperature for 15 minutes, during which time water is removed and the reaction mass become hard. Further condensation for 15 hours yields a condensation product with a nitrogen content of 17.2%.

EXAMPLE 11

With stirring, 330 g of N,N'-dimethylol urea area added to, and mixed with, 537.5 g of a 40% aqueous solution of the compound of the formula (11) which has been adjusted to pH 4. The milky mixture obtained is stirred and heated to 60° C., then 23 g of 15% sulfamic acid are added, whereupon the temperature rises to 68° C. in the course of 8 minutes and the reaction mixture congeals. The reaction mass is then heated to reflux temperature (98° C.), in the course of which stirring can be resumed after 10 minutes because of melting on the glass wall of the reactor. Further condensation for 1 hour yields a highly viscous crude condensate, which is poured onto metal drying plates. The water is removed at 90° C. and the residue is dried at 110° C. for 12 hours and then purified by washing with water, affording 390 g of a pure product with a nitrogen content of 25.8%. The dry powder is comminuted in a cross beater mill to a granular size smaller than 100μ. Similarly good adsorption agents with a nitrogen content of 18 to 25% are obtained by replacing sulfamic acid as catalyst by ammonium nitrate, ammonium phosphate or ammonium chloride, and dimethylol urea by trimethylol melamine dimethyl ether, hexamethylol melamine, N,N'-dimethylolurone dimethyl ether or hexamethylol melamine hexamethyl ether.

EXAMPLES 12 TO 21

A stirred reactor is charged with 5 liters of a red residual liquor which has been adjusted to pH 3 or 7 and which still contains 100 mg/l of the dye of the formula

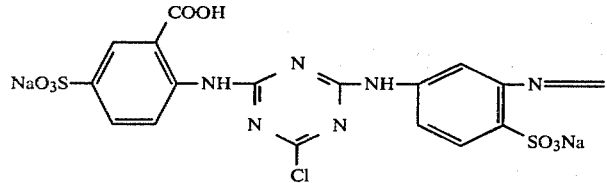

in dissolved form. The dye liquor is heated to a temperature of 50° C. and, in each test, 0.5 g of one of the anion exchangers prepared according to Examples 1 to 10 is added in powder form. A sample is taken on each occasion after an adsorption time of x minutes and filtered through a folded filter. The percentage discolouration of the filtrate reported in Table 2 is determined.

TABLE 2

| Example | Adsorbents prepared according to Example | pH | Adsorption time in minutes | Discolouration in % |
|---|---|---|---|---|
| 12 | 1 | 7 | 60 | 65.8 |
| 13 | 2 | 7 | 60 | 21.6 |
| 14 | 3 | 7 | 60 | 27.2 |
| 15 | 4 | 3 | 60 | 46.5 |
| 16 | 5 | 3 | 60 | 32 |
| 17 | 6 | 3 | 60 | 18.9 |
| 18 | 7 | 3 | 5 | 80.5 |
| 19 | 8 | 3 | 60 | 15.2 |
| 20 | 9 | 7 | 60 | 6.9 |
| 21 | 10 | 7 | 60 | 21.5 |

EXAMPLE 22

In a glass beaker, a solution of 500 mg of a dye of the formula (100) in 500 ml of water is adjusted to pH 7 with a sodium carbonate solution. With stirring, 500 g of the condensation product of Example 11 are added at 50° C. to this dye solution and kept at this temperature for 60 minutes. The treated solution contains only 125 ml of dye, corresponding to 75% decolouration. The dye precipitate is collected by filtration. The moist filter cake has a solids content of 50% and can be incinerated direct without further evaporation.

What is claimed is:

1. A process for the removal of an anionic substance from an aqueous solution, which process comprises bringing said solution into contact with a cationic adsorption agent which has been obtained by reaction of
   (a) an amino compound which contains at least one amino group and at least one free or methylolated carboxamide group, with
   (b) an aminoplast precondensate which does not contain an amino group, in a ratio of 1 mole of component (a) per 0.2 to 10 moles of component (b), in an aqueous medium at a pH value between about 2 and 7.

2. A process according to claim 1, wherein the anionic substances are anionic dyes, fluorescent whitening agents, textile or dyeing assistants, surfactants, tannins or mixtures thereof.

3. A process according to claim 1, wherein the removal of the anionic substances is carried out in the temperature range from 2° to 150° C.

4. A process according to claim 1, wherein the removal of the anionic substances is carried out by the stirring or fixed bed method.

5. A process according to claim 1, wherein the cationic adsorption agent is mixed with activated carbon.

6. The process of claim 1, wherein the component (a) of the adsorption agent is an amino compound of the formula $$\begin{array}{c} R_1 \\ \diagdown \\ \phantom{R}N\text{---}\!\!\left[Q\text{---}\!\!\underset{\underset{R_3}{|}}{N}\!\!\right]_{m-1}\!\!\!\!\!\text{---}Q_1\text{---}CO\text{---}\underset{\underset{Y}{|}}{N}\text{---}X \\ \diagup \\ R_2 \end{array} \qquad (1)$$

wherein m is 1 to 5, each of $R_1$, $R_2$ and $R_3$ independently is hydrogen, lower alkyl which is unsubstituted or substituted by halogen, hydroxyl, lower alkoxy or cyano, or is cycloalkyl, benzyl or a group of the formula $$-Q_1-CO-\underset{\underset{Y}{|}}{N}-X \qquad (2)$$

or $R_1$ and $R_2$, together with the nitrogen atom to which they are attached, represent a 5- or 6-membered heterocyclic radical, or, if m is 2, $R_2$ and $R_3$, together with the grouping >N—Q—N< which links them, represent a divalent 5- or 6-membered heterocyclic radical, or, if m is greater than 2, each $R_3$, or individual substituents $R_3$, together with the adjacent $R_3$ and the grouping >N—Q—N< which links them, also represent a divalent 5- or 6-membered heterocyclic radical, each of Q and $Q_1$ independently is alkylene of 1 to 8 carbon atoms, X is hydrogen or —$CH_2OH$, and Y is hydrogen, lower alkyl or —$CH_2OH$.

7. The process of claim 6, wherein component (a) of the adsorption agent is an amino compound of the formula (1), wherein m is 1 or 2.

8. The process of claim 7, wherein component (a) of the adsorption agent is an amino compound of formula (1), wherein each of $R_1$, $R_2$ and $R_3$ independently is hydrogen, lower alkyl, benzyl or a group of formula (2), or $R_1$ and $R_2$ together with the nitrogen atom to which they are attached represent a 5- or 6-membered heterocyclic radical, or, if m is 2, $R_2$ and $R_3$, together with the grouping >N—Q—N< which links them, is a piperazino ring, and each of Q and $Q_1$ is $C_1$-$C_3$alkylene.

9. The process of claim 8, wherein component (a) of the adsorption agent is an amino compound of formula (1), wherein each of $R_1$, $R_2$ and $R_3$ is hydrogen, lower alkyl or benzyl.

10. The process of claim 9, wherein component (a) of the adsorption agent is an amino compound of formula (1), wherein m is 1.

11. The process of claim 10, wherein component (a) of the adsorption agent is an amino compound of formula (1), wherein $Q_1$ is ethylene or propylene, each of $R_1$ and $R_2$ is lower alkyl, Y is hydrogen and X is —$CH_2OH$.

12. The process of claim 1, wherein components (a) and (b) together contain at least two N-methylolamide groups.

13. The process of claim 1, wherein component (b) is a methylolated urea or amino-1,3,5-triazine, each of which is unetherified or etherified.

14. The process of claim 13, wherein component (b) is a N-methylol urea or N-methylol melamine.

15. The process of claim 14, wherein component (b) is N,N'-dimethylol urea or tri- to hexa-methylol melamine.

* * * * *